Patented July 29, 1930

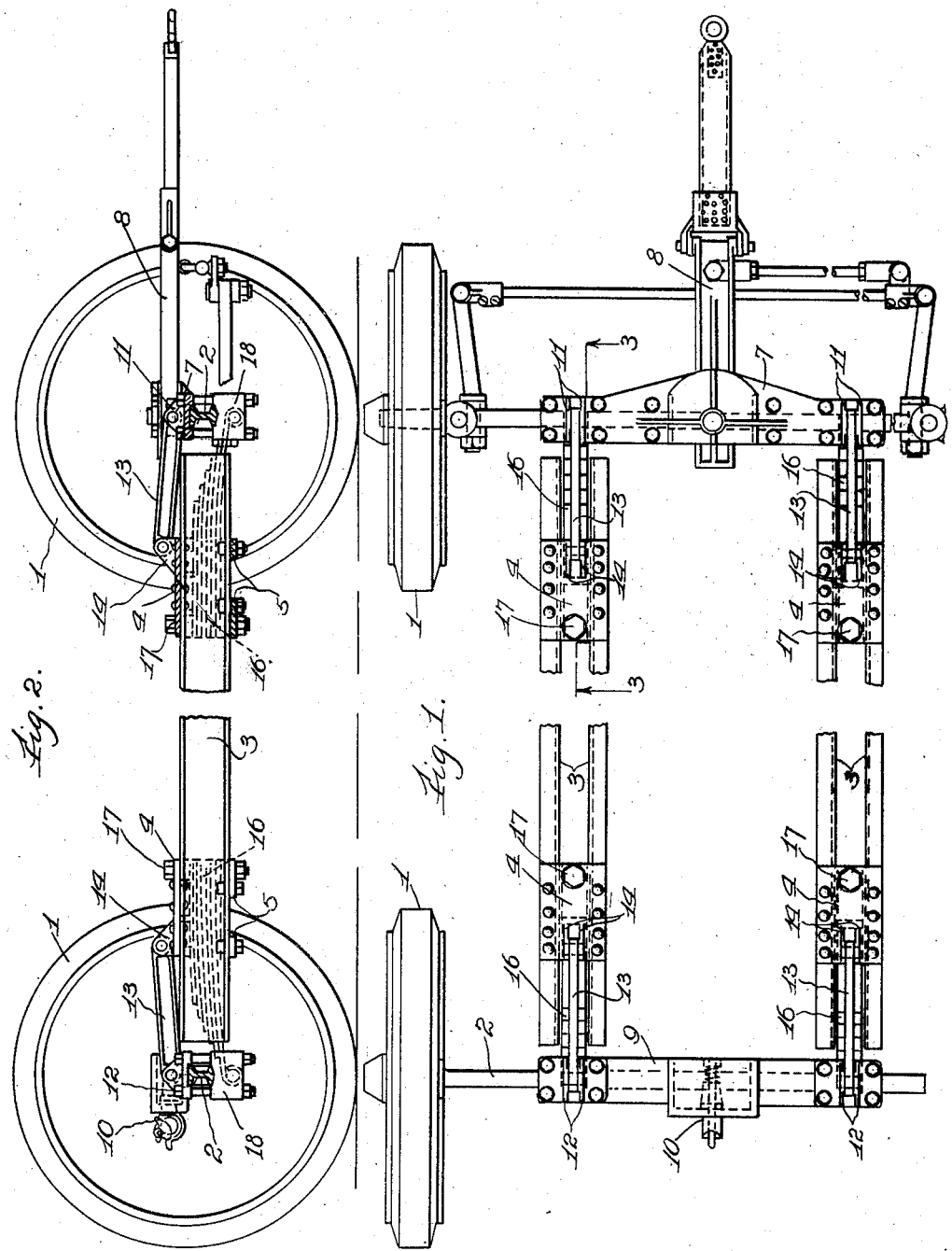

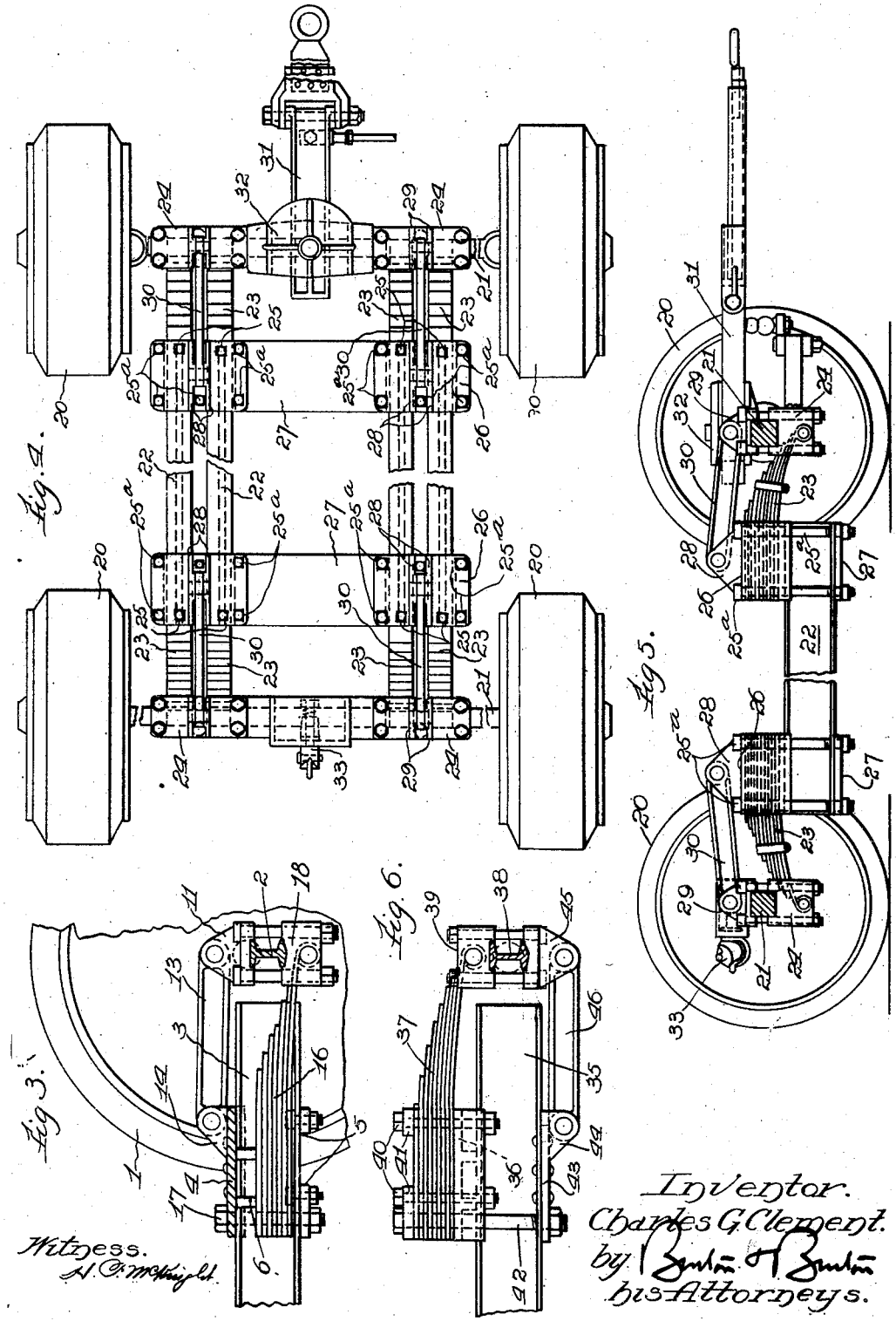

1,771,571

UNITED STATES PATENT OFFICE

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN

STRAIGHT-FRAME TRAILER

Application filed September 9, 1927. Serial No. 218,450.

This invention relates to vehicles and more particularly to vehicles of the trailer type, and has for its object to provide an improved vehicle frame of low construction in which the pull exerted on the draw bar may be transmitted through the frame in substantially a straight line. It consists of certain features and elements of construction in combination as herein shown and described and as indicated by the claims.

In the drawings:

Figure 1 is a plan view of a vehicle frame embodying this invention.

Figure 2 is a side elevation of the vehicle frame, with the near wheels omitted.

Figure 3 is a longitudinal section through the frame, taken on line, 3—3, Figure 1.

Figure 4 is a plan view of a vehicle frame of modified construction.

Figure 5 is a side elevation of the modified frame of Figure 4; and

Figure 6 is a detail section of a further modification of a vehicle frame.

Vehicles of the trailer type, provided with farmes of low construction, are especially adaptable for hauling relatively heavy objects, and it is therefore highly desirable to have the floor of the vehicle as near as possible to the ground level. It is also a desirable feature to so construct the frame that the pull exerted on the draw bar will be transmitted through the frame in substantially a straight line.

In the drawings, Figures, 1 and 2, illustrate a preferred embodiment of my invention. The vehicle frame is carried on the usual supporting wheels, 1, and axles, 2. Said frame is composed of two side members, each including a pair of longitudinally extending channels, 3, connected together "back to back" in spaced relation by cast bracket members, 4, adjacent the ends thereof. The bracket members extend across and are secured to the upper flanges of said channels, while the lower flanges of the channels are connected together by tie bars, 5. Each bracket is provided with downwardly depending ribs, 6, intermediate said channel backs. The front axle, 2, is provided with a cast draw head, 7, bolted thereto, said head supporting a draw bar, 8, for pulling the vehicle. The rear axle, 2, has a cast end member, 9, bolted thereon, and is provided at the middle of its width with a usual pintle type coupling, 10, for engaging the draw bar of another vehicle for pulling in a train. The steering mechanism for the vehicle forms no part of the present invention.

Both the cast draw head, 7, and the cast end member, 9, are provided with a pair of upwardly extending ears, 11, and 12, respectively, adjacent the ends, on their upper sides, for pivotally engaging the ends of longitudinally extending controlling links, 13. The other end of each link is pivotally connected between correspondingly aligned upstanding ears, 14, on the upper side of bracket member, 4, centrally with respect to the channel side members, 3, of the frame. These controlling links are adapted to transmit the pull exerted by the draw bar, 8, on the draw head casting, 7, to the channel side members, 3, of the frame.

The frame and its load is supported on the axles, by quarter elliptic springs, 16, extending from the ends of the side members of the frame. The springs are mounted intermediate the pairs of channels, 3, at the ends thereof, on the bars, 5, and are held against vertical displacement by the downward extending ribs, 6, of the bracket members, 4. These springs are fixed in place against longitudinal movement, by stay bolts, 17, extending through the brackets, 4, and engaging all the leaves of said springs, as well as the tie bars, 5. The ends of the springs extending beyond the ends of the channels, 3, are perched in a usual manner, below the axles, 2, in suitable brackets, 18, bolted to the draw head casting, 7, and the cast rear end member, 9. It will be noted that this construction, as clearly illustrated in Figures 1, 2 and 3, permits the axles, 2, and frame side members, 3, to be disposed symmetrically in substantially horizontal alignment.

Figures 4 and 5, illustrate a modification of low vehicle frame construction, especially adaptable for "heavy duty". The vehicle is provided with the usual supporting wheels, 20, and axles, 21, for supporting the frame, which includes a pair of side members, each comprising a pair of longitudinally extending I-beams, 22, connected together in spaced relation. Quarter elliptic springs, 23, are carried on the ends of each I-beam and extend outwardly with their free ends perched below the axles, 2, in suitable brackets, 24, bolted on said axles. These springs are held in fixed position on top of said I-beams, by stay bolts, 25, extending through cast bracket members, 26, engaging all the leaves of said springs and connecting to tie plates, 27, attached to the lower flanges of said beams. The brackets, 26, reach across the tops of both springs on the pair of I-beams, and project downwardly on opposite sides of the springs to form a partial guide therefor, together with guide bolts, 25ª, connecting said brackets, 26, with the tie plate, 27. The top of each bracket, 26, and the upper portion of axle bracket, 24, above the axle is provided with upstanding ears, 28, and 29, respectively, centrally aligned with respect to the springs, 23. Said ears have the ends of controlling links, 30, pivoted therein, so that these links serve to transmit the pull exerted by a draw bar, 31, on the draw head, 32, (secured on the front axle between brackets, 24) to the side members of the vehicle frame. A pintle type coupling, 33, is mounted on the rear axle, 2, for the usual purpose. Although in this modified construction the pull will not be strictly in a straight line, nevertheless it provides a lower frame, which is suitable for hauling heavy objects and obviates labor in loading.

A further modification of low frame construction is illustrated in Figure 6. In this construction, the side members of the frame, each comprise a pair of flanged beams, 35, having bracket members, 36, mounted on the upper side thereof at the ends, for supporting longitudinally extending quarter elliptic springs, 37. The brackets serve as a tie connection for the beams, and also to sufficiently elevate the springs, 37, so that the outer ends may be perched above the axle, 38, in an axle bracket, 39, bolted on said axle. The springs are secured to the beams by stay bolts, 40, extending through tie plate, 41, disposed across the top of said springs, and through all the leaves of the spring and secured to the flanges of the beams. Guide bolts, 42, extend outside the springs and beams and extend through tie plates, 41, and bracket plates, 43, secured to the lower flanges of the beams. Bracket plate, 43, and axle bracket, 36, each have a pair of downwardly depending ears, 44 and 45, respectively for pivotally supporting the ends of a controlling link, 46, disposed on central alignment with the springs and beams. It may be noted that this construction permits the axle, 38, to be disposed in precisely central, horizontal alignment with the beam members, 35, of the frame, which permits the pull to be transmitted in substantially a straight line.

I claim:

1. In a vehicle, the combination of a frame, having supporting wheels and axles, said frame including a pair of spaced longitudinally extending side members disposed in a plane at least as low as the common plane of the axles, and leaf springs positioned within the vertical limits of the frame, each having one end fixedly connected to one of said side members, the other end being pivotally connected to the underside of one of said axles.

2. In a vehicle, the combination of a frame, supporting wheels and axles therefor, a drawbar connected to one of said axles for pulling said vehicle, said frame being disposed substantially in the common plane of the axles, springs for yieldingly supporting the frame and disposed within the vertical limits thereof, one end of each spring being connected to the frame, and the other end connected to the under side of the axle, whereby the pull exerted through the drawbar may be transmitted through said frame in an approximately straight line, together with additional means connecting said frame and axles.

3. In a vehicle, the combination of a frame, supporting wheels and axles therefor, said frame comprising a pair of spaced longitudinally extending side members, each of said members including a pair of flanged beams spaced side by side and springs interposed between each pair of beams at each end thereof, one end of each spring being connected to the adjacent ends of one pair of flanged beams, the other end having a connection to the under side of the axle for supporting said beams.

4. In a vehicle, the combination of a frame, supporting wheels and axles therefor, said frame including a pair of spaced, longitudinally extending side members, each of said members being composed of a pair of flanged beams, disposed in spaced relation, leaf springs, having a portion thereof mounted between respective pairs of said beams, the forward ends of said springs being pivotally connected to said axles, and controlling links, each having one end pivotally connected to the upper side of the axle and the other end connected to the adjacent ends of a pair of beams to transmit the pull on the axle through the entire frame.

5. In the construction defined in claim 3, each of said side members extending closely adjacent the springs and longitudinally beyond their connection to them by a distance more than half the length of said springs.

6. In a vehicle, the combination of a frame, supporting wheels and axles therefor, a drawbar connected to one of said axles for pulling said vehicle, said frame being disposed substantially in the common horizontal median plane of the axles and springs for yieldingly supporting the frame, and disposed within the vertical limits thereof, one end of each spring being connected to the frame, and the other end connected to the under side of the adjacent axle, whereby the pull exerted through the draw-bar may be transmitted through said frame in an approximately straight line.

7. In a vehicle, the combination of a frame, supporting wheels and axles therefor, a draw-bar connected to one of said axles for pulling said vehicle, said frame being disposed substantially in the common horizontal median plane of the axles, and springs for yieldingly supporting the frame and disposed within the vertical limits thereof, one end of each spring being connected to the frame and the other end connected to the adjacent axle, whereby the pull exerted through the draw-bar may be transmitted through said frame in an approximately straight line.

8. In a vehicle, the combination of a frame, supporting wheels and axles therefor, a draw-bar connected to the front axle for pulling the vehicle, said frame being disposed substantially in the common horizontal median plane of the axles, springs for yieldingly supporting the frame and disposed within the vertical limits thereof, one end of each spring being connected to the frame and the other end connected to the adjacent axle, and a coupling secured to the rear axle for receiving the end of the draw-bar of a trailer vehicle to be drawn thereby, whereby the pull exerted on the draw-bar of the first mentioned vehicle may be transmitted through the frame of said vehicle in an approximately straight line to the draw-bar of the trailing vehicle.

9. In a trailer vehicle, a frame, supporting wheels and axles therefor, a drawbar connected to one of said axles for pulling the vehicle, said frame including a pair of transversely spaced longitudinally extending side members, and springs connected to the axles for yieldingly supporting said side members in substantially the same plane as the axles, whereby the pull on the axles may be transmitted through the frame in an approximately straight line.

CHARLES G. CLEMENT.